United States Patent [19]

Uemura et al.

[11] 4,239,545

[45] Dec. 16, 1980

[54] CELLULOSE DERIVATIVE REVERSE OSMOSIS MEMBRANE AND CASTING SOLUTION AND ADDITIVE FOR PREPARING THE SAME

[75] Inventors: Tadahiro Uemura, Kyoto; Masaru Kurihara, Otsu, both of Japan

[73] Assignee: Toray Industries, Inc., Tokyo, Japan

[21] Appl. No.: 932,533

[22] Filed: Aug. 10, 1978

[51] Int. Cl.³ ............................ C08L 1/12; C08L 1/28
[52] U.S. Cl. .................................. 106/181; 106/196; 106/197 R; 210/500.2

[58] Field of Search ................... 106/181, 196, 197 R; 210/500 M; 562/509, 590

[56] References Cited

U.S. PATENT DOCUMENTS

| 3,673,084 | 6/1972 | King et al. | 210/23 |
| 3,773,534 | 11/1973 | Kaiser et al. | 106/178 |

Primary Examiner—Theodore E. Pertilla
Attorney, Agent, or Firm—Miller & Prestia

[57] ABSTRACT

Cellulose derivative reverse osmosis membrane containing tetracarboxylic acid and mono- or divalent carboxylic acid.

10 Claims, No Drawings

CELLULOSE DERIVATIVE REVERSE OSMOSIS MEMBRANE AND CASTING SOLUTION AND ADDITIVE FOR PREPARING THE SAME

This invention relates to an improved reverse osmosis membrane and to a method of making the same from a cellulose derivative. This invention further relates to a casting solution for preparing the same, and to a casting solution additive used for making a reverse osmosis membrane.

Phenomena involving spontaneous passage of pure water into an aqueous solution, or from a less concentrated aqueous solution to a more concentrated aqueous solution, when separated by a semipermeable membrane, are generally called "direct osmosis".

On the other hand, passage of pure water in the opposite direction, that is, movement of pure water or of a pure solvent from a more concentrated to a less concentrated solution through a semipermeable membrane under an external force which is greater than osmotic pressure, such force being applied to the more concentrated solution, is called "reverse osmosis".

Reverse osmosis is now widely available for many applications such as desalination from saline or brackish water, pollution control, water reclamation, food processing and many other separation, concentration and recovery processes.

Since Loeb et al developed a technique for making asymmetric reverse osmosis membranes in 1961, many research programs on reverse osmosis membranes have been very actively conducted. In 1966 Manjikian et al succeeded in developing a reverse osmosis membrane which was capable of practical use.

Many studies on more improved membranes have been pursued actively and many improved membranes have now been suggested. These improved membranes, for example, are prepared from cellulose derivatives (especially cellulose acetate) casting solutions composed of solvents for cellulose derivatives and additives such as perchlorate salts (U.S. Pat. No. 3,133,132), water-soluble liquid amides (U.S. Pat. No. 3,344,214), mineral acids (U.S. Pat. No. 3,444,286), organic amine salts (U.S. Pat. No. 3,522,335), di- or tri-basic aliphatic acids (U.S. Pat. No. 3,673,084), water (U.S. Pat. No. 3,917,777) and/or maleic acid mono methyl ester (Laid-Open Japanese Application No. 35074/75).

Membranes of the type referred to include an (upper) skin layer and a (lower) porous layer.

As is well known to those skilled in the art, it is necessary, in order to obtain membranes having optimum performance with respect to both salt rejection and water permeability, to provide a skin layer on the membrane fine structure which is as thin as possible. This requirement, however, leads to a decrease of the durability of the membrane, and more specifically causes the following further difficulties:

1. The rate of water permeability is decreased because of compaction of the membrane during the high pressure operation.
2. The salt concentration of the permeated water increases gradually during prolonged operation because of cracking and stretching of the upper layer (skin layer) of the membrane. This is caused by voids such as membrane defects in the form of large cellular finger-like cavities appearing in the under layer (porous layer) of the membrane during the gelling stage of membrane fabrication.

Loss in water permeability can be overcome to a certain extent by controlling the annealing temperature during the step of heat treatment in the process of membrane fabrication. By increasing the annealing temperature, the unfavorable influence of membrane compaction is reduced.

The latter difficulty (gradual increase of salt concentration) however, is rather difficult to overcome. Voids tend to appear as the membrane separation characteristics are improved. When the membrane is caused to possess high separation characteristics by controlling membrane fabrication conditions, the number of voids generally tends to increase. Further, when the membrane fabrication conditions are selected in a manner to prevent the membrane from possessing such voids, the total membrane separation characteristic, particularly the combination of salt rejection and water permeability, is remarkably reduced.

The objects of the present invention are accordingly to provide an improved reverse osmosis membrane having a good balance of membrane separation characteristics, rate of water permeability and salt rejection, having a minimum of voids and possessing high durability, and to provide an additive for the membrane casting solution from which such a membrane can be made.

The novel cellulose derivative reverse osmosis membrane of the present invention has not less than about $3 \times 10^{-10}$ g$^3$/cm$^7$.sec.$^2$.atm$^3$, preferably not less than about $7 \times 10^{-10}$ g$^3$/cm$^7$.sec.$^2$.atm$^3$, of $A^3/B$ and not more than about 0.2, preferably not more than about 0.1, voids per 0.844 mm$^2$. As defined herein, A is the water permeation coefficient (g/cm$^2$.sec.atm) and is defined as:

$$A = F_1/(\Delta P - \Delta \pi)$$

wherein $F_1$ is the rate of product water flow through the membrane g/cm$^2$.sec), $\Delta P$ is the applied pressure differential (atm) and $\Delta \pi$ is the osmotic pressure differential (atm).

As further defined herein, B is the salt permeation coefficient (cm/sec) calculated from the following equation:

$$B = F_2/(C_1 - C_2),$$

wherein $F_2$ is the salt permeation through the membrane (g/cm$^2$.sec), $C_1$ is the salt concentration in the concentrate (g/cm$^3$) and $C_2$ is the salt concentration in the product water (g/cm$^3$).

The term "void" as defined herein means a membrane defect such as an occlusion, bubble, pore defect, or cellular and/or fingerlike cavity or other cavity, all of which appear in the under layer (porous layer) of the membrane during the gelling stage of membrane fabrication. The meaning of "void" is fully explained by C.W. Saltonstall in Office of Saline Water, Res. Develop. Prog. Rept. No. 434, 1969.

The number of voids is conveniently measured by means of a microscope.

This novel reverse osmosis membrane can be prepared from a casting solution containing a cellulose derivative, an organic solvent therefor and a tetracarboxylic acid represented by the formula R—(CO$_2$H)$_4$, wherein R is a substituted or unsubstituted tetrafunctional aliphatic or alicyclic organic radical having from 2 to 10 carbon atoms.

Examples of the cellulose derivative used in the practice of the present invention include cellulose acetate, cellulose propionate, cellulose acetate propionate, cellulose acetate butyrate, methylcellulose and ethyl cellulose. The most preferable are the cellulose acetate groups, including cellulose acetate, cellulose diacetate, cellulose triacetate, mixtures of cellulose diacetate and cellulose triacetate, and cellulose which is acetylated to an extent between the diacetate and the triacetate.

The practical acetyl content of the cellulose acetate, based on cellulose acetate, is from about 39.8% to about 43.2% by weight, and the range from about 40.5% to about 42.5% is preferable in order to obtain an improved reverse osmosis membrane having excellent properties of water permeability and salt rejection.

Examples of the organic solvent used in the practice of the present invention are acetone, tetrahydrofuran, dimethylformamide, dioxane, dimethylsulfoxide, acetic acid, diethyleneglycol, diacetone alcohol, acetonitrile, nitromethane and mixtures thereof.

Examples of the tetracarboxylic acid are butanetetracarboxylic acid, ethylene tetracarboxylic acid, cyclopropanetetracarboxylic acid, cyclobutanetetracarboxylic acid, cyclopentanetetracarboxylic acid and furantetracarboxylic acid. The preferable form is a butanetetracarboxylic acid, such as 1,2,3,4-butanetetracarboxylic acid.

The casting solution can be prepared in the following manner, for example:

The cellulose derivative is dissolved in an organic solvent. The solution is typically composed of 20 parts by weight of cellulose derivative and from about 30 to about 180 parts by weight, preferably from about 50 to about 80 parts by weight, of organic solvent. To this solution from about 2 to about 49 parts by weight, preferably from about 2 to about 20 parts by weight of tetracarboxylic acid are added.

As a practical matter, the tetracarboxylic acid may be added as a solution in water, methanol, acetone or other solvent for tetracarboxylic acid. Methanol is preferable.

In addition to tetracarboxylic acid, the usage of another additive, monovalent and/or divalent carboxylic acid, brings about good results. The monovalent or divalent carboxylic acids are exemplified as follows:

glycolic acid, oxalic acid, maleic acid, maleic acid monomethyl ester, malonic acid, glutaric acid, formic acid, and citric acid.

Most preferable is maleic acid.

The mole fraction of the monovalent and/or divalent carboxylic acid is generally not more than about 0.55, preferably from about 0.20 to about 0.55, preferably about 0.20 to 0.40, based on the entire amount of the additive, that is, tetracarboxylic acid and monovalent and/or divalent carboxylic acid.

The casting solution described above may be made into a membrane having improved performance, less voids and high durability in accordance with the following steps:

1. Casting step:
    The casting solution is poured on a substrate such as a glass plate or woven or non-woven fabric.
2. Evaporation step:
    The organic solvent is partially evaporated.
3. Coagulation step:
    The cast membrane is immersed in water.
4. Annealing step;
    The resulting membrane is heated.

In the practice of the present invention, however, the coagulation bath temperature is not limited to a range from 0° to 5° C. or below, which is the usual condition employed in preparing cellulose membranes. In contrast, temperatures of about 15°–20° C. may be used, which means that cooling devices can be omitted.

By modifying the fabrication conditions, it is possible to obtain a highly water permeable type membrane which may be used effectively as an ultrafiltration membrane.

In the following Examples and Comparative Examples, the performances of the membranes were measured under the following conditions:

salt concentration: 2500 ppm of NaCl
driving pressure: 30 kg/cm$^2$
flow rate: 1.0 m/sec
flow temperature: 25° C.

The m-value was calculated as follows:

$$m = \log(F/F_O)/\log(T/T_O),$$

wherein
F is the water permeability at time T
$F_O$ is the water permeability at time $T_O$
(T is typically 200 hours)
($T_O$ is typically 1 hour). The mean number of voids was calculated after ten series of observations in an area of 0.844 mm$^2$ in the microscope. The elongation at break was measured with a Tensilon Universal Tester (Type UPM-3, Toyo Borudowin Inc.), using the following technique:

Membrane strips of 5 millimeters width were held at 4 centimeters distance and pulled at a rate of 2 centimeters/minute. The elongation at break was determined by dividing the stretched length until a break by 4 centimeters length.

EXAMPLE 1

Cellulose triacetate having 43.2% by weight of acetyl content (Eastman Cellulose Triacetate A-432-130B) and cellulose diacetate having 39.8% by weight of acetyl content (Eastman Cellulose Diacetate E-398-3) were used in this Example.

A casting solution was prepared from 8 grams of cellulose triacetate, 12 grams of cellulose diacetate, 40 grams of 1,4-dioxane, 27 grams of acetone and 3 grams of 1,2,3,4-butanetetracarboxylic acid dissolved in 10 grams of methanol.

The casting solution was cast on a glass plate at 30° C. by using a doctor blade to obtain a film of 0.2 millimeter thickness. After partial evaporation of the solvent for a minute, the film was coagulated in cold water which was maintained at 5° C. for 10 minutes.

During the coagulation process, the film was floated off the glass plate and was annealed in hot water at 75° C. for 5 minutes to produce a membrane.

The membrane properties were as follows:
flux: 0.8 m$^3$/m$^2$day
salt rejection: 97%
m-value: greater than $-0.01$
voids: none
Elongation at break: about 13%.

Another membrane, which was annealed at 80° C. instead of 75° C., had the following properties:
flux: 0.6 m$^3$/m$^2$day
salt rejection: 98%
m-value: about zero
voids; none elongation at break: about 11%

The salt rejection of the membrane increased from 98.0% to 98.5% after 200 hours test.

EXAMPLE 2

A casting solution was prepared from 20 grams of cellulose diacetate having 39.8% by weight of acetyl content, 40 grams of acetone, 15 grams of 1,4-dioxane, 12 grams of acetonitrile, 10 grams of methanol and 3 grams of 1,2,3,4-butanetetracarboxylic acid.

From this casting solution, a membrane was obtained in accordance with the same conditions as Example 1. Annealing was conducted at 75° C. for 5 minutes. The properties of the membrane were as follows:
 flux: 1.5 m$^3$/m$^2$day
 salt rejection: 87%
 m-value: −0.02
 voids: none
 elongation at break: 10%

EXAMPLE 3

A casting solution was prepared from 10 grams of cellulose triacetate having 43.2% by weight of acetyl content, 50 grams of 1,4-dioxane, 10 grams of acetone, 12 grams of dimethylsulfoxide, 3 grams of 1,2,3,4-butanetetracarboxylic acid and 15 grams of methanol.

From this casting solution, a membrane was obtained in accordance with the same conditions as Example 2. The properties of the membrane were as follows:
 flux: 3 m$^3$/m$^2$day
 salt rejection: 11%
 voids: none
 elongation at break: 10%

EXAMPLE 4

Cyclopentanetetracarboxylic acid was used instead of the 1,2,3,4-butanetetracarboxylic acid of Example 1. Annealing was conducted at 75° C. for 5 minutes. The properties of the membrane were as follows:
 flux: 0.7 m$^3$/m$^2$day
 salt rejection: 96%
 voids: none
 elongation at break: 12%

EXAMPLE 5

A casting solution was prepared using 2 grams of 1,2,3,4-butanetetracarboxylic acid and 1 gram of maleic acid instead of 3 grams of 1,2,3,4-butanetetracarboxylic acid as in Example 1. The annealing step was conducted at 75° C. for 5 minutes. The properties of the membrane were as follows:
 flux: 0.8 m$^3$/m$^2$day
 salt rejection: 97%
 voids: none
 elongation at break: 12%

EXAMPLE 6

1 gram of glycolic acid was used instead of maleic acid as in Example 5. The properties of the membrane obtained were as follows:
 flux: 0.75 m$^3$/m$^2$day
 salt rejection: 97%
 voids: none
 elongation at break: 11.5%

EXAMPLE 7

A membrane was prepared in accordance with Example 1 except that the coagulation step was effected at 15° C. for 10 minutes. The annealing step was conducted at 75° C. for 5 minutes. The properties of the membrane were as follows:
 flux: 0.75 m$^3$/m$^2$day
 salt rejection: 97%
 voids: none
 elongation at break: 12%

EXAMPLE 8

A membrane was prepared in accordance with Example 5 except that the coagulation step was effected at 15° C. for 10 minutes. The annealing step was conducted at 75° C. for 5 minutes. The properties of the membrane were as follows:
 flux: 0.6 m$^3$/m$^2$day
 salt rejection: 98%
 voids: none

EXAMPLE 9

In Example 7, 2.4 grams of 1,2,3,4-butanetetracarboxylic acid and 0.6 gram of maleic acid were used instead of 3 grams of 1,2,3,4-butanetetracarboxylic acid. The properties of the membrane were as follows:
 flux: 0.65 m$^3$/m$^2$day
 salt rejection: 98%
 voids: none

EXAMPLE 10

A membrane was prepared in accordance with Example 9 using 2.5 grams of 1,2,3,4-butanetetracarboxylic acid and 0.5 gram of maleic acid instead of 2.4 grams of 1,2,3,4-butanetetracarboxylic acid and 0.6 gram of maleic acid. The properties of the membrane were as follows:
 flux: 0.7 m$^3$/m$^2$day
 salt rejection: 98%
 voids: none.

EXAMPLE 11

A membrane was prepared in accordance with Example 9 using 2.6 grams of 1,2,3,4-butanetetracarboxylic acid and 0.4 gram of maleic acid instead of 2.4 grams of 1,2,3,4-butanetetracarboxylic acid and 0.6 gram of maleic acid. The properties of the membrane were as follows:
 flux: 0.65 m$^3$/m$^2$day
 salt rejection: 98%
 voids: none

COMPARATIVE EXAMPLE 1

A membrane was produced according to the same method used in Example 1 except that 3 grams of oxalic acid were used instead of 3 grams of 1,2,3,4-butanetetracarboxylic acid. The annealing step was conducted at 75° C. for 5 minutes. The properties of the membrane were as follows:
 flux: 0.8 m$^3$/m$^2$day
 salt rejection: 96%
 m-value: −0.03
 number of voids: 450 per 0.844mm$^2$
 elongation at break: 5%

The salt rejection decreased to 94% after 200 hours test.

COMPARATIVE EXAMPLE 2

A membrane was prepared in accordance with the same procedure used in Comparative Example 1 except that pyromellitic acid was used instead of oxalic acid. The membrane properties were as follows:
flux: 0.43 m³/m²day
salt rejection: 54%
Numerous voids were observed.

COMPARATIVE EXAMPLE 3

A membrane was prepared in accordance with the same procedure used in Comparative Example 1 except that acetic acid was used instead of oxalic acid. The membrane properties were as follows:
flux: 0.6 m³/m²day
salt rejection: 93%
number of voids: about 500 per 0.844 mm²
elongation at break: 6%

COMPARATIVE EXAMPLE 4

A membrane was produced in accordance with Example 9 using 3 grams of maleic acid instead of 2.4 grams of 1,2,3,4-butanetetracarboxylic acid and 0.6 gram of maleic acid. The membrane properties were as follows:
flux: 0.45 m³/m²day
salt rejection: 98.5%
number of voids: 1.2 per 0.844 mm²

We claim:

1. In a casting solution for the preparation of a membrane of a cellulose derivative selected from the group consisting of cellulose ether and cellulose ester, having a good balance of membrane separation characteristics, said solution containing said cellulose derivative, and an organic water soluble solvent therefor, the improvement which comprises including a tetracarboxylic acid represented by the following formula:

$$R-(CO_2H)_4$$

wherein R is a tetravalent aliphatic or alicyclic organic radical having from 2 to 10 carbon atoms, whereby the membrane which is prepared has not more than 0.2 voids per 0.844 mm².

2. The casting solution in accordance with claim 1, wherein the cellulose derivative is a member selected from the group consisting of cellulose acetate, cellulose acetate propionate, cellulose acetate butyrate, methyl cellulose and ethyl cellulose.

3. The casting solution of claim 2, wherein the cellulose derivative is a cellulose acetate.

4. The casting solution of claim 1, wherein the amount of tetracarboxylic acid is from about 1 to about 20 parts by weight per 10 parts by weight of the cellulose derivative.

5. The casting solution of claim 1, wherein the tetracarboxylic acid is selected from the group consisting of butanetetracarboxylic acid, ethylene tetracarboxylic acid, cyclopropanetetracarboxylic acid, cyclobutanetetracarboxylic acid, cyclopentanetetracarboxylic acid and furantetracarboxylic acid.

6. The casting solution of claim 5 wherein the tetracarboxylic acid is a 1,2,3,4-butanetetracarboxylic acid.

7. The casting solution of claim 1, which further contains a member selected from the group consisting of monocarboxylic acid and dicarboxylic acid.

8. The casting solution of claim 7, wherein the mole fraction of the member based on the total mols of the member and tetracarboxylic acid contained in the casting solution is not more than about 0.55.

9. The casting solution of claim 8, wherein said mole fraction is from about 0.20 to about 0.40.

10. The casting solution of claim 7, wherein the dicarboxylic acid is a maleic acid.

* * * * *